Figure 1:
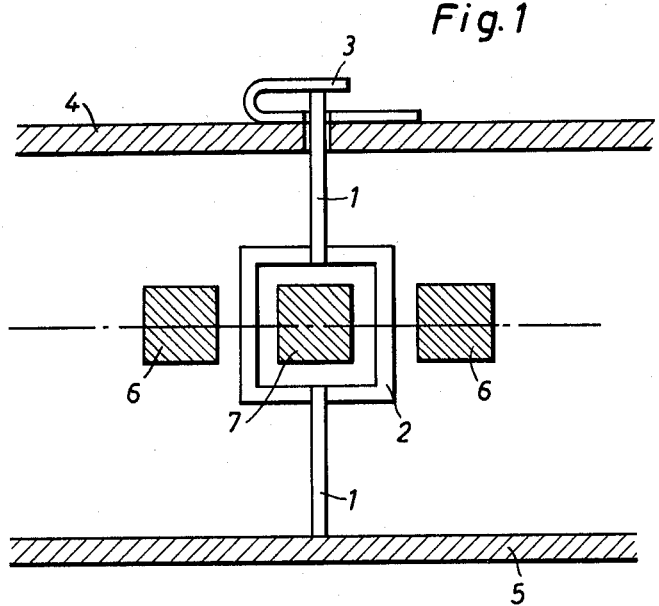

April 12, 1966    A. DURER ET AL    3,245,781
TENSIONING STRIPS IN MEASURING INSTRUMENTS
AND AN ALLOY FOR USE THEREIN
Filed Dec. 18, 1962

INVENTORS:
ALFRED DURER, KONRAD RUTHARDT, HERMANN SPEIDEL
BY
Burgess, Dinklage & Sprung
ATTORNEYS

United States Patent Office 3,245,781
Patented Apr. 12, 1966

3,245,781
TENSIONING STRIPS IN MEASURING INSTRUMENTS AND AN ALLOY FOR USE THEREIN
Alfred Durer, Dusseldorf, and Konrad Ruthardt and Hermann Speidel, Hanau am Main, Germany, assignors to W. C. Heraeus G.m.b.H., Hanau am Main, Germany, a corporation
Filed Dec. 18, 1962, Ser. No. 245,490
4 Claims. (Cl. 75—172)

This invention relates to tensioning strips in measuring instruments and to an alloy for use therein.

Numerous noble metal alloys, particularly alloys of platinum and alloys of gold with additives of the various types of other noble metals and also base metals are known as material for physical precision instruments. Because of their chemical and mechanical resistance, these alloys have been used for a large variety of different parts of the physical precision instruments. For measuring instruments with a rotatable meter mechanism, in which the mechanism is at the present time very often fixed in its position by tension strips as well as by point suspensions, platinum-iridium alloys with an iridium content up to 30% and platinum-nickel alloys with a nickel content of 8 to 12.5% have up to now preferably been used as the material for these tension strips.

Various types of different requirements or standards are demanded in such tensioning strips. Thus, a high resistance to corrosion of the strip is essential for the life of the measuring instrument. In order to position the measuring instrument economically in the meter the material should have a good capacity for soldering and be able to be positioned without the necessity of employing time-wasting auxiliary means and without the use of corrosive fluxes. The elastic distortion of the strips should be as low as possible in the interest of good measuring accuracy. Nevertheless, the alloy must be capable of being satisfactorily deformed in order to permit the production of strips of comparatively large width and small thickness.

These conditions have already largley satisfied by the aforementioned alloys. A study of their properties did however show that they impose limits on the construction of measuring instruments with a rotatable meter mechanism, which can surprisingly be substantially obviated by simple technical means.

The up-to-date objective in design of measuring instruments is the construction of meter mechanisms with low torques, the tensioning band of which is under strong tension in order to make them insensitive to inclination and vibrations. The construction of such measuring instruments using the prior known alloys, is limited by that fact that the tension of the strips cannot be further increased with a certain torque, which must not be exceeded in order to produce a sufficient measurement sensitivity. It has now been found that it is possible to select platinum metal alloys which make possible a major technical advance in this field. This followed from the investigation of certain mechanical properties as described below.

The high elastic limit and the low torsional modulus principally decide the quality of an alloy used for tension strips. These two conditions determine the maximum loading capacity of a tensioning strip at a predetermined permissible torque. The tension strips are generally used in a stiffened form, but when considering the suitability of a material for tension strips, it is also possible to take into account its tensile strength instead of the elastic limit, since this strength value is near the elastic limit with stiffened materials. It was also found that the tensile strength of the material divided by the root of the torsional modulus is of decisive importance from the point of view of the suitability of a material as a tension strip. This value of $$Z = \frac{\sigma_B}{\sqrt{G}}$$

($\sigma_B$=tensile strength, G=torsional modulus), ascertainable from values which can easily be measured, gives a relative standard as to the amount to which a tension strip of a certain torque can be tensioned in its main direction.

It has now been found that a platinum metal alloy of the composition comprising 1 to 50% and advantageously 5 to 40% of one or more of the metals iron, cobalt, nickel, tungsten, molybdenum, copper and silver, the remainder being platinum, palladium and/or rhodium, with the proviso that in the case of a binary alloy of the platinum, the lower limit for the base addition is 15%, can be used as material for tension strips in measuring instruments having a rotatable meter mechanism and provides surprising technical advantages in this particular field.

Whereas the platinum alloys hitherto used as material for tension strips had Z-values of 1.3 to 1.4 when calculated from the tensile strength and torsional modulus, the alloys used according to the invention have Z-values which are higher than 1.5 and in particular higher than 1.7 and may be for example even reach 2.5. These high values result from the properties which are essential for tension strip materials and which are extremely favourable in the case of the present alloys, namely, a high tensile strength an a low torsional modulus of the alloys. The alloys likewise have the additional properties necessary for materials used for tension strips, such as high resistance to corrosion, good solderability and deformability and a low elastic distortion.

It has moreover been found that the excellent properties of the alloys are not influenced if the metals platinum, palladium and rhodium mentioned as main constituents are replaced by other metals of the platinum group, in particular iridium, in quantities from 1 to 30%. Up to 20% of the platinum metals may be replaced by gold if desired.

Alloys which have proved particularly suitable are platinum alloys with iron, cobalt and particularly nickel, the content of these base metals amounting to 15 to 50%, advantageously 20 to 40%. In this case, up to 30% of the platinum can be replaced by other platinum metals; instead of the platinum metals, up to 20% of gold can be present. By a comparison with the platinum alloys hitherto employed and having a nickel content of 8 to 12.5%, the alloys with a higher nickel content are characterised by considerably improved properties.

Alloys with 5%, 8.5%, 12%, 15%, 20% and 30% of nickel, the remainder being platinum, were investigated. The torsional modulus G thereof was determined by several measurements and in each case the mean value was established therefrom. In addition, the tensile strength $\sigma_B$ of the alloys in the deformed and solidified condition was measured and thereafter, from both values, the value for the actual quality factor $$Z = \frac{\sigma_B}{\sqrt{G}}$$

was calculated, that is to say, the tensile strength of the material divided by the root of the torsional modulus. As already stated, this quality factor Z gives a relative standard as to how strongly a tension strip of a certain torque can be loaded by tension in its main direction.

The values obtained are set out in the following table:

| Pt-Ni in percent | Torsional modulus G (mean value) | Tensile strength $\sigma_B$ | $Z=\dfrac{\sigma_B}{\sqrt{G}}$ |
|---|---|---|---|
| 95–5 | 7,105 | 90 | 1.07 |
| 91.5–8.5 | 7,414 | 117 | 1.36 |
| 88–12 | 7,434 | 136 | 1.58 |
| 85–15 | 7,605 | 147 | 1.68 |
| 80–20 | 7,472 | 160 | 1.86 |
| 70–30 | 7,492 | 165 | 1.91 |

It can clearly be seen from this table that as the nickel content increases, the tensile strength of the alloys also increases which was not otherwise to be expected. The torsional modulus initially also increases, but only up to a nickel content of 15%, and then falls again with higher nickel contents. The decrease in the torsional modulus with simultaneous further increase in the tensile strength with platinum-nickel alloys having more than 15% of nickel results in the extraordinarily favourable values for the quality factor of these alloys, which values are decidedly above $Z=1.5$.

Of the alloys of platinum metals other than platinum itself, the alloys of rhodium have, for example, proved satisfactory in practice, more especially alloys with the composition of 5 to 50% of the metals iron, cobalt and more especially nickel and the remainder rhodium; in this case, up to 20% of the rhodium can be replaced by other platinum metals and/or gold.

Particular technical advantages are also produced by using alloys of the platinum metals, in which two or more base metals are present, for example alloys of the platinum metals with 1 to 20% and advantageously 3 to 10% of tungsten, and 1 to 20% advantageously 3 to 10% of copper, and the remainder, but at least 70%, being metals of the platinum group, more especially platinum or also palladium.

With many of the said alloys, it is possible to obtain an improvement in their properties, particularly the tensile strength and thus the increase in the values for Z, by thermal tempering, as for example with platinum-tungsten-copper alloys.

Examples of alloys which are suitable for use as tension strip materials in measuring instruments with a rotatable meter mechanism according to the invention are given below.

| Alloy composition | Tensile strength, kg./mm.² | Torsion modulus, kg./mm.² | Z-value |
|---|---|---|---|
| (1) 70 Pt, 30 Ni | 166 | 7,500 | 1.92 |
| (2) 70 Rh, 30 Ni | 201 | 10,500 | 1.92 |
| (3) 90 Pt, 5 W, 5 Cu | 141 | 7,800 | 1.60 |
| (4) As 3, but tempered | 178 | 8,100 | 1.98 |

The examples of alloys set out in the table have proved particularly suitable for use as materials for tension strips in measuring instruments having a rotatable meter component. They conform to all mechanical requirements, such as those set out above as being desirable, and also have in addition the other properties which, as explained above, are required of tension strips. By comparison with the alloys hereinbefore described and known for the purpose, they provide a major technical advance which makes possible the development of new types of measuring instruments.

In addition to the use for tension strips for electrical measuring instruments, such as rotating coil instruments and soft iron instruments, the said alloys are also particularly suitable for use as tension strip materials in measuring instruments of a different type with a rotatable system, such as torsion balances.

A measuring instrument with a rotatable meter mechanism and using a tension strip of the material according to the invention is shown by way of example in the accompanying drawing.

Figure 2:
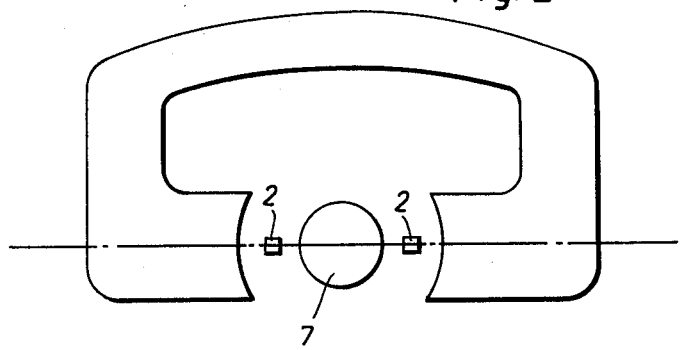

Referring to FIG. 1 of the drawing, which is a side elevation of such a measuring instrument it will be seen that this consists of a tension strip 1, a loop 2 of the rotatable meter component and a tension spring 3. The tension strip is supported between an upper support 4 and a lower support 5. The magnet of the instrument is shown at 6 and the magnetic core at 7. In FIG. 2, the magnet 6, magnet core 7 and loop 2 of the measuring instrument are shown in section.

We claim:

1. In the operation of a measuring instrument having a rotatable meter mechanism and a tension strip, the use of an alloy consisting of 80% platinum and 20% nickel as the said tension strip wherein the ratio (Z) of tensile strength ($\sigma_B$) to the root of the torsional modulus ($\sqrt{G}$) = 1.86.

2. In the operation of a measuring instrument having a rotatable meter mechanism and a tension strip, the use of an alloy consisting of 70% platinum and 30% nickel as the said tension strip wherein the ratio (Z) of tensile strength ($\sigma_B$) to the root of the torsional modulus ($\sqrt{G}$) = 1.91.

3. In the operation of a measuring instrument having a rotatable meter mechanism and a tension strip, the use of an alloy consisting of 70% rhodium and 30% nickel as the said tension strip wherein the ratio (Z) of tensile strength ($\sigma_B$) to the root of the torsional modulus ($\sqrt{G}$) = 1.92.

4. In the operation of a measuring instrument having a rotatable meter mechanism and a tension strip, the use of an alloy consisting of 90% platinum, 5% tungsten, and 5% copper as the said tension strip wherein the ratio (Z) of tensile strength ($\sigma_B$) to the root of the torsional modulus ($\sqrt{G}$) = 1.60.

References Cited by the Examiner

UNITED STATES PATENTS

| | | | |
|---|---|---|---|
| 1,166,129 | 12/1915 | Heyl | 75—172 |
| 1,779,602 | 10/1930 | Kingsbury | 75—172 |
| 1,832,307 | 11/1931 | Kingsbury | 75—172 |
| 2,890,114 | 6/1959 | Ruthardt et al. | 75—172 |
| 2,897,443 | 7/1959 | Mendelsohn et al. | 324—97 |
| 2,946,679 | 7/1960 | Darling | 75—172 |
| 3,111,623 | 11/1963 | Thomander | 324—154 |

OTHER REFERENCES

"The Platinum Metals and Their Alloys," published by International Nickel Company, New York 5, New York. Copyright 1941. pp. 43–45; 58–70; 74–78; 80–84; 94–98; 104–109; 115–116; 119–121; 125–127; 130–131.

DAVID L. RECK, *Primary Examiner.*

WINSTON A. DOUGLAS, *Examiner.*